(12) United States Patent
Weida

(10) Patent No.: US 12,496,921 B2
(45) Date of Patent: Dec. 16, 2025

(54) ELECTRONIC DEVICE, POWER FACTOR CORRECTION FILTER, AND AN ON-BOARD CHARGING DEVICE

(71) Applicant: Bayerische Motoren Werke Aktiengesellschaft, Munich (DE)

(72) Inventor: Daniel Weida, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 648 days.

(21) Appl. No.: 17/987,160

(22) Filed: Nov. 15, 2022

(65) Prior Publication Data
US 2023/0150379 A1 May 18, 2023

(30) Foreign Application Priority Data
Nov. 16, 2021 (DE) .................. 10 2021 129 790.7

(51) Int. Cl.
*H02M 1/00* (2007.01)
*B60L 53/22* (2019.01)
(Continued)

(52) U.S. Cl.
CPC ............ *B60L 53/22* (2019.02); *H02J 7/06* (2013.01); *H02M 1/4225* (2013.01); *H02J 2310/48* (2020.01)

(58) Field of Classification Search
CPC ............ H02M 1/4233; H02M 1/0009; H02M 1/0003; H02M 1/4225; H02M 1/4266; H02J 2310/48
See application file for complete search history.

(56) References Cited

U.S. PATENT DOCUMENTS 10,985,649 B2    4/2021 Murakami et al.
12,395,063 B1*   8/2025 Bing ................... H02M 1/0009
(Continued)

FOREIGN PATENT DOCUMENTS

DE    10 2018 203 054 A1    9/2019

OTHER PUBLICATIONS

German-language Search Report issued in German Application No. 10 2021 129 790.7 dated Aug. 2, 2022 with partial English translation (10 pages).

*Primary Examiner* — Tuan T Lam
(74) *Attorney, Agent, or Firm* — Crowell & Moring LLP

(57) ABSTRACT

An electronic device, a power factor correction filter, and an electronic device are provided. The electronic device includes at least one first inductor, a second inductor, a first comparator circuit, a second comparator circuit, a first reference signal generator, and a second reference signal generator. The first inductor and the second inductor are coupled inductors. The first/second comparator circuit is coupled at a first input to a first/second actuating element, at a second input to the first/second reference signal generator, and at an output to a first/second control circuit. The first/second control circuit is coupled to the first/second inductor in order to output a first/second current signal to the first/second inductor. The first and second reference signals are generated such that the two reference signals differ from each other with respect to time, in order to reduce a deviation from a predefined phase shift between the first current signal and the second current signal.

10 Claims, 5 Drawing Sheets

(51) Int. Cl.
*H02J 7/06* (2006.01)
*H02M 1/42* (2007.01)

(56) References Cited

U.S. PATENT DOCUMENTS

| | | | |
|---|---|---|---|
| 2016/0190912 A1* | 6/2016 | Lim | H02M 1/4225 |
| | | | 363/84 |
| 2017/0294833 A1 | 10/2017 | Yang et al. | |
| 2020/0139187 A1* | 5/2020 | Kennington | A63B 71/0622 |
| 2020/0412272 A1 | 12/2020 | Raimann et al. | |
| 2023/0299664 A1* | 9/2023 | Cui | H02M 1/4225 |
| 2024/0030807 A1* | 1/2024 | Messina | H02M 1/4233 |

* cited by examiner

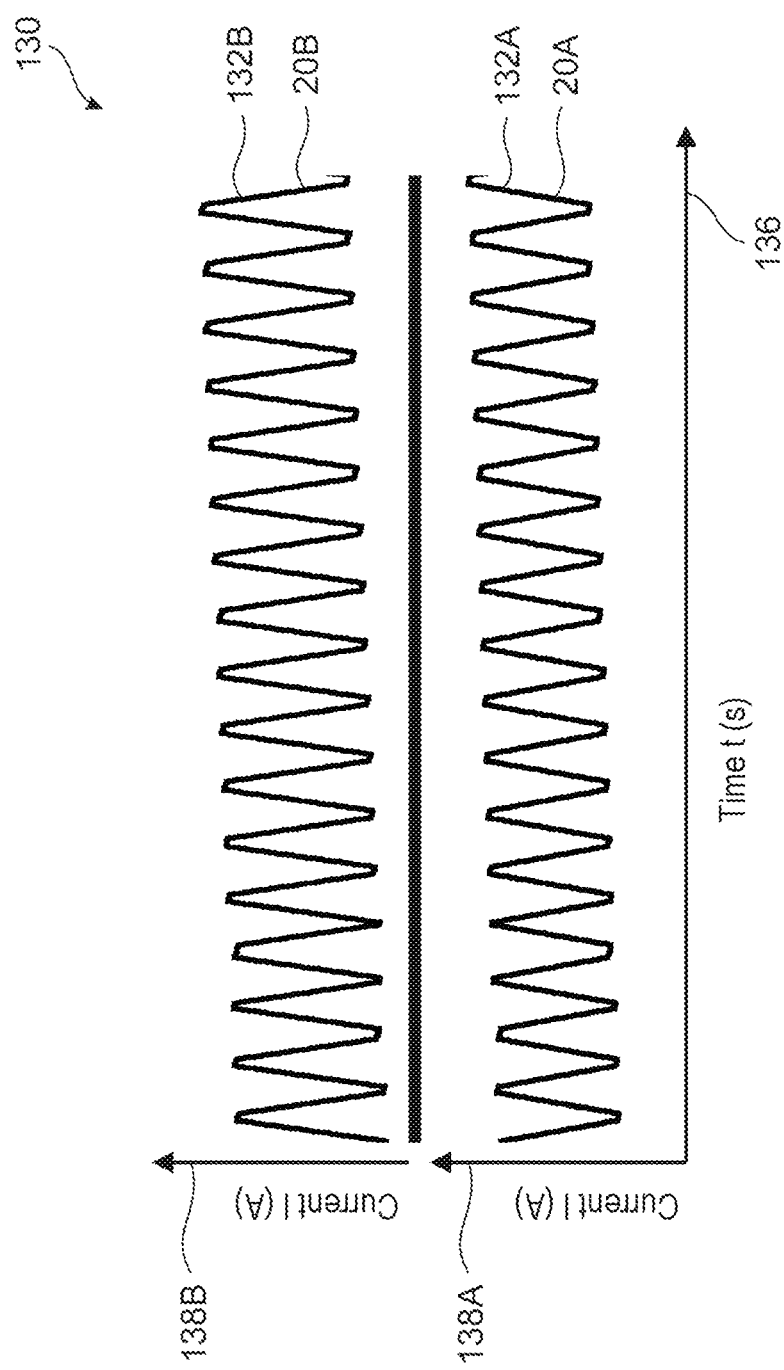

ELECTRONIC DEVICE, POWER FACTOR CORRECTION FILTER, AND AN ON-BOARD CHARGING DEVICE

CROSS REFERENCE TO RELATED APPLICATION

This application claims priority under 35 U.S.C. § 119 from German Patent Application No. DE 10 2021 129 790.7, filed Nov. 16, 2021, the entire disclosure of which is herein expressly incorporated by reference.

BACKGROUND AND SUMMARY

The present invention relates to an electronic device, a power factor correction filter, and an on-board charging device.

Coupled inductors having multiple phases have advantages as compared to uncoupled, separate inductors. For example, coupled inductors having multiple phases enable optimizations with respect to installation space and weight. These exemplary advantages make coupled inductors interesting for use in power factor correction filters of charging devices for at least partially electrically driven vehicles, since the range of the vehicles can be increased as a result.

Since coupled inductors have a common magnetic path in which the inductive effect of the particular coupled inductors cancel each other out given an appropriate winding direction and current flow direction, coupled inductors are also superior to uncoupled inductors with respect to electromagnetic compatibility (EMC).

Coupled inductors are regulated individually or jointly, i.e., identically. The control of coupled inductors must be carried out, however, such that an undesirable magnetic saturation due to an asymmetrical loading of the involved inductors is avoided. For example, an asymmetrical loading can result from the control itself, due to delays in the regulation or due to component tolerances. Naturally, these effects can also arise in combination and reinforce each other. Thereupon, high currents can undesirably arise, which can damage components of the underlying electronic device or of a coupled load.

The problem addressed by the present invention is therefore that of providing an electronic device having at least two coupled inductors, in which electronic device an asymmetrical loading of the inductors is avoided.

The problem addressed by the invention is also that of providing a power factor correction filter with an electronic device of this type, and an on-board charging device for an at least partially electrically driven vehicle.

The problem is solved by the subjects of the independent patent claims. Advantageous embodiments are described in the dependent patent claims and the following description. Each of the advantageous embodiments can represent aspects of the invention alone or in (sub-)combination.

According to one aspect, an electronic device is provided, which has at least a first inductor, a second inductor, a first comparator circuit, a second comparator circuit, a first reference signal generator, and a second reference signal generator. The first inductor and the second inductor are arranged such that these have a common magnetic path, via which the first inductor and the second inductor are inductively coupled to each other. The first comparator circuit is coupled at a first input to a first actuating element, at a second input to the first reference signal generator, and at an output to a first control circuit. The first control circuit is coupled to the first inductor in order to output a first current signal to the first inductor. The second comparator circuit is coupled at a first input to a second actuating element, at a second input to the second reference signal generator, and at an output to a second control circuit. The second control circuit is coupled to the second inductor in order to output a second current signal to the second inductor. The first reference signal generator outputs a first reference signal to the first comparator circuit and the second reference signal generator outputs a second reference signal to the second comparator circuit. The two reference signal generators are designed for generating the first reference signal and the second reference signal such that the two reference signals differ from each other with respect to time, in order to reduce a deviation from a predefined phase shift between the first current signal and the second current signal.

A predefined phase shift between the first current signal, which is applied to the first inductor, and the second current signal, which is applied to the second inductor, would generally result in a symmetrical loading of the inductors. For example, the predefined phase shift could be 180°. The current signals would then be (exactly) counterdirectional with respect to the phase shift. The predefined phase shift is dependent, in general, on the basic constructional conditions. The predefined phase shift can also differ from 180° if further influences are taken into account, which have an (additional) influence on the effective phase shift.

A deviation from the predefined phase shift causes an asymmetrical loading of the first inductor and the second inductor. The first inductor and the second inductor are then acted upon by the underlying current signals such that an undesirable magnetic saturation can arise, which can result in inadvertent current amplitudes and/or component damage.

The present invention can avoid these disadvantages by way of the first reference signal and the second reference signal deviating from each other. The deviation between the reference signals results, for the comparator circuits within one switching period, in the threshold value exceedances being generally achieved at different points in time of the switching period. The time difference between the different points in time of the threshold value exceedances depends on the deviation of the phase shift from the predefined phase shift between the first current signal and the second current signal. As a result, a phase correction mechanism is created, in order to reduce the deviation from the predefined phase shift.

Advantageously, the deviation from the predefined phase shift can also be (nearly) completely compensated for. The phase shift between the first current signal and the second current signal can therefore also be adapted such that this phase shift essentially corresponds to the predefined phase shift.

The first inductor and the second inductor can be, for example, parts of a transformer, of a transmitter, of a power converter, or of an electric machine. It is essential only that the first inductor and the second inductor have a common magnetic path, via which the first inductor and the second inductor are inductively coupled to each other.

The first reference signal generator and the second reference signal generator can also be implemented in a single reference signal generator device.

In one refinement, the first reference signal can have a ramp component and the second reference signal can be constant with respect to time. The ramp component makes it possible for the current signals of the individual inductors to synchronize with each other in their minima and maxima and in the time profile. As a result, deviations from the predefined phase shift can be particularly permissibly reduced and/or compensated for.

The ramp portion can be provided by a ramp generator, which can be part of the first reference signal generator or of the reference signal generator device.

The first reference signal generator can output a first ramp reference signal and a second ramp reference signal to the first comparator circuit, the first and second ramp reference signals having different slopes. In particular, the first ramp reference signal and the second ramp reference signal can have slopes with different signs. The ramp reference signals are then simultaneously utilized within the first comparator circuit for determining different threshold value conditions. In particular, in this way, an upper threshold value condition and a lower threshold value condition can be analyzed, preferably simultaneously. In this way, the deviation from the predefined phase shift can be determined regardless of the sign of the deviation, thus simplifying the subsequent correction of the deviation.

For example, the two ramp reference signals can be utilized in two separate subcomponents of the first comparator circuit, in particular in a greater-than element and in a less-than element.

In one further embodiment, the first comparator circuit and the second comparator circuit can run synchronously with respect to time. This can be enabled, for example, by a timer of the electronic device. Therefore, the detection of the deviation from the predefined phase shift is simplified.

Advantageously, the first comparator circuit can output a first comparator signal to the first control circuit and the second comparator circuit can output a second comparator signal to the second control circuit. The first control circuit and/or the second control circuit can be configured such that the deviation from the predefined phase shift is reduced.

Preferably, a phase of the first current signal can be adaptable based on the first comparator signal and a phase of the second current signal can be adaptable based on the second comparator signal. Thereupon, the phases of the first current signal and/or of the second current signal can be adapted to predefined phase angles.

The correction of the deviation from the predefined phase shift can be enabled due to the fact that the detected time difference between the different points in time of the threshold value exceedances are taken into account by the first control circuit and/or the second control circuit. For example, the first current signal for the first inductor and/or the second current signal for the second inductor can be provided by a driver circuit and/or by semiconductor components, which are regulated by the first control circuit and/or the second control circuit. The first control circuit and/or the second control circuit can then control the driver circuit and/or the semiconductor components based on the detected time difference such that the deviation from the predefined shaft shift between the first current signal and the second current signal is immediately reduced. Therefore, an asymmetrical loading of the first inductor and the second inductor is immediately countered.

Optionally, the first control circuit and the second control circuit can also be implemented by a single control circuit.

The electronic device can additionally include at least one half-bridge that has at least one center tap. The half-bridge is switchable based on the first comparator signal and/or the second comparator signal such that the phase of the first current signal and/or the phase of the second current signal are/is adapted to particular predefined phase angles. For this purpose, the half-bridge is coupled to the first control circuit and/or the second control circuit. The first and/or the second control circuit(s) can trigger, in particular, a switch of the half-bridge. The half-bridge can include multiple semiconductor components, in particular transistors, as is known.

A first fault current signal is provided to the first comparator circuit by the first actuating element, the first fault current signal indicating a deviation of the actual current signal of the first inductor from a target current signal.

A second fault current signal is provided to the second comparator circuit by the second actuating element, the second fault current signal indicating a deviation of the actual current signal of the second inductor from the target current signal.

As a result, the regulation of appropriately predetermined target values is enabled. In the present case, the target current signal is taken into account in the determination of the two fault current signals. In that respect, the two fault current signals are determined for the different comparator circuits based on the same target current signal, for example, due to a parallel circuit. As a result, the symmetry of the loading of the two inductors is also reinforced in this aspect.

In one alternative embodiment, different target current signals are used for determining the particular fault current signals for the comparator circuits. This can be advantageous when target current signals having temporally varying phase angles are advantageous, for example, for constructional reasons.

According to one further aspect, a power factor correction filter is provided with an electronic device as explained above. The first inductor and the second inductor are used as inductively coupled inductors of the power factor correction filter. As a result, a power factor correction filter having optimized installation space and a reduced overall weight can be achieved.

In one refinement, the first actuating element can include a first differentiating element and the second actuating element can include a second differentiating element. The first differentiating element then outputs a first differential signal based on a first actual current signal of the first inductor and on a target current signal to the first comparator circuit. The second differentiating element outputs a second differential signal based on a second actual current signal of the second inductor and on the target current signal to the second comparator circuit.

The differentiating element is a particularly simple possibility for evaluating the actual current signal in relation to the target current signal and making the determined result available for further use of the regulation mechanism.

According to one further aspect, an on-board charging device is also provided, as described above, for an at least partially electrically driven vehicle that includes a power factor correction filter.

According to an additional aspect, an at least partially electrically driven vehicle is also provided, which includes an on-board charging device as described above.

Within the scope of the present invention, at least partially electrically driven vehicles can include, in particular, land vehicles, namely, among other things, electric scooters, e-scooters, two-wheelers, motorcycles, three-wheelers, trikes, quads, off-road and road vehicles, such as passenger cars, busses, trucks, tractors, and other commercial vehicles, rail vehicles (trains), but also watercraft (boats) and aircraft, such as helicopters, multicopters, propeller aircraft, and jet aircraft, which include at least one electric motor for propelling the vehicle. Vehicles can be manned or unmanned. The vehicles can be not only pure electric vehicles (BEV), but also plug-in hybrids (PHEV) and fuel cell electric vehicles (FCEV).

The invention and further advantageous embodiments and refinements of the invention are described and explained in greater detail in the following with reference to the examples represented in the drawings. The features to be derived from the description and the drawings can be applied according to the invention alone or in arbitrary combination.

BRIEF DESCRIPTION OF THE DRAWINGS

FIG. 5 is a simplified schematic representation of exemplary current signal profiles for coupled inductors.

All features disclosed in the following with reference to the exemplary embodiments and/or the accompanying figures can be combined alone or in an arbitrary subcombination with features of the aspects of the present disclosure, including features of preferred embodiments, provided that the resultant combination of features is meaningful for a person skilled in the art in the technical field.

DETAILED DESCRIPTION OF THE DRAWINGS

Figure 1:
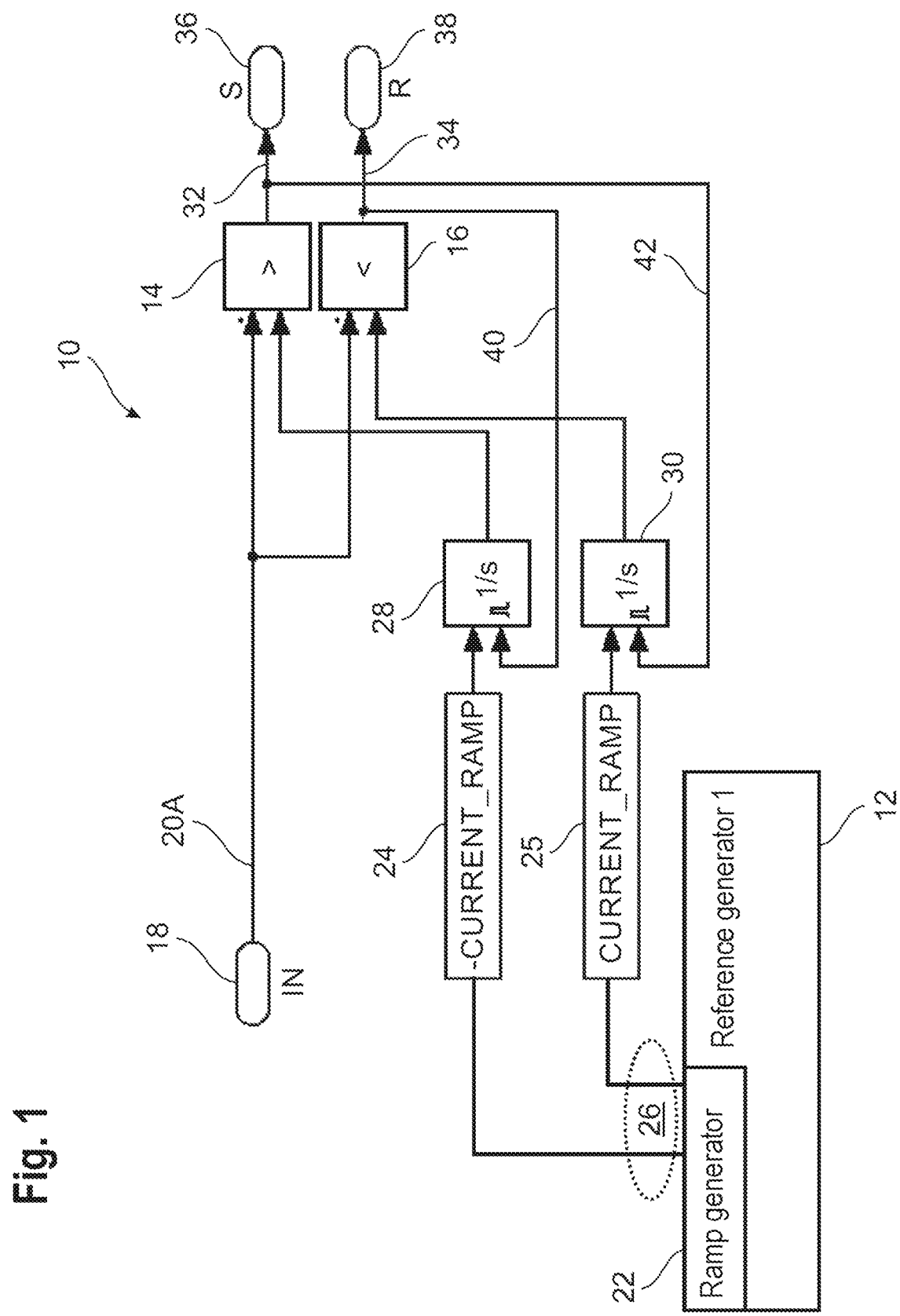
FIG. 1 is a simplified schematic representation of a first comparator circuit that includes a first reference signal generator.

FIG. 1 shows a simplified schematic representation of a first comparator circuit 10, which is coupled to a first reference signal generator 12. The first comparator circuit 10 is assigned to the first inductor and is at least indirectly coupled to the first inductor, as explained below.

The first comparator circuit 10 includes, among other things, two subcomponents, a greater-than element 14 and a less-than element 16. An input of the greater-than element 14 and an input of the less-than element 16 are both connected to an input node 18 of the comparator circuit 10 in the manner of a parallel circuit. A first fault current signal 20A is provided at the input node 18, the first fault current signal 20A indicating a measure of the deviation of the actual current signal of the first inductor from the target current signal.

In the present case, the first reference signal generator 12 includes a ramp generator 22. The ramp generator 22 provides two different ramp components, and so two different ramp reference signals 24, 25 (-CURRENT_RAMP; CURRENT_RAMP) are output by the first reference signal generator 12. The slopes of the ramp components are opposite, i.e., they have different signs. For linguistic simplification, the two ramp reference signals 24, 25 can be considered jointly as a first reference signal 26 of the first reference signal generator 12, which provides the first reference signal 26 for the first comparator circuit 10.

A second input of the greater-than element 14 and a second input of the less-than element 16 are acted upon by the different ramp reference signals 24, 25, respectively, after the different ramp reference signals 24, 25 have been adapted to the underlying switching frequency by means of the timers 28, 30, respectively.

The greater-than element 14 and the less-than element 16 operate simultaneously in this regard and make it possible to detect when the first fault current signal 20A exceeds or falls below one of the two ramp reference signals 24, 25 within a clock pulse period of the underlying switching frequency. According to the satisfied threshold value condition of the greater-than element 14 or of the less-than element 16, comparator signals 32, 34 are provided at the output nodes 36, 38 (S, R), respectively, of the first comparator circuit 10 for a first control circuit, in order to adapt the first current signal of the first inductor according to the phase.

The timers 28, 30 are also coupled to the output nodes 38, 36 (R, S), respectively, according to two loops 40, 42, respectively.

Figure 2:
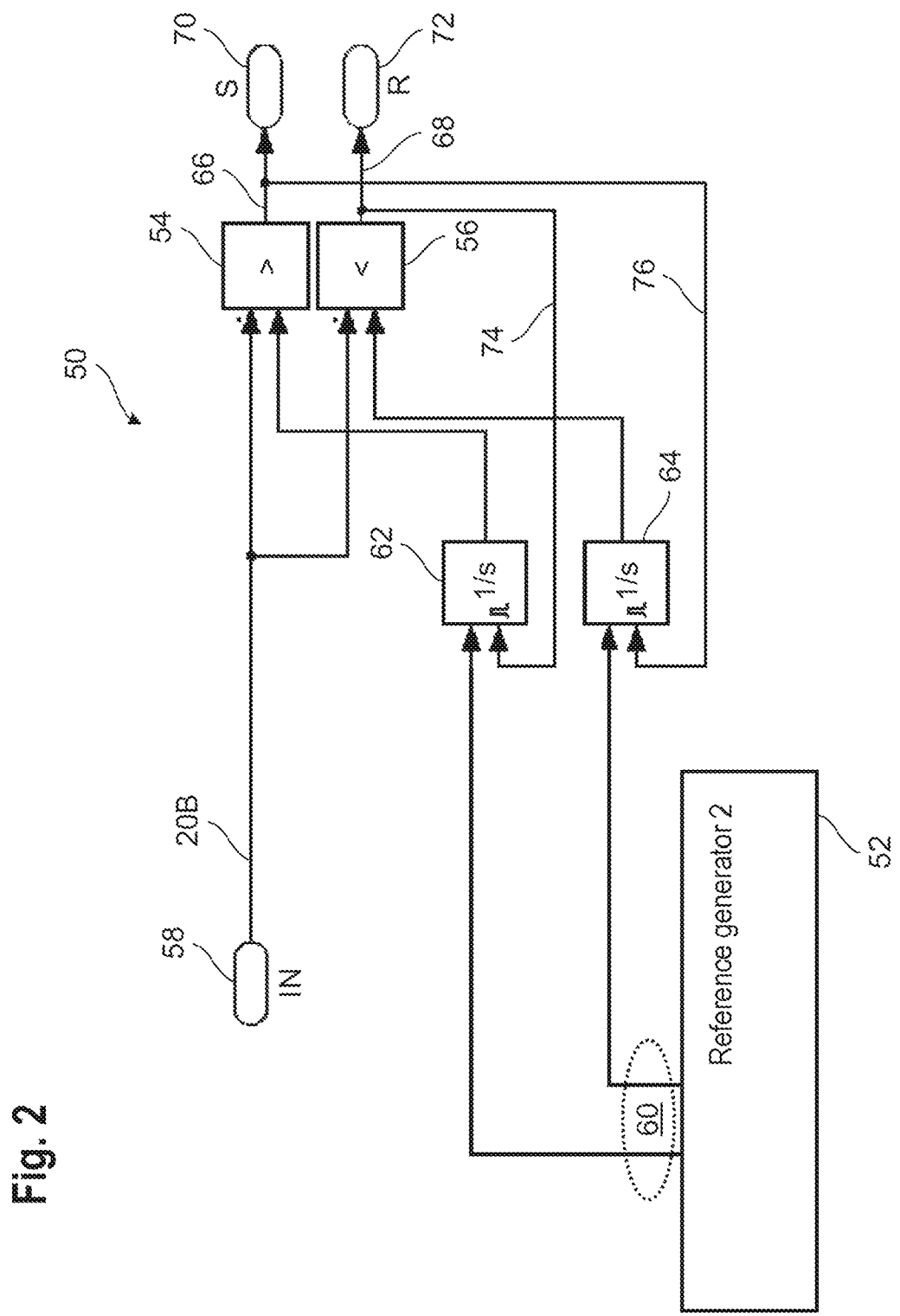
FIG. 2 is a simplified schematic representation of a second comparator circuit that includes a second reference signal generator.

FIG. 2 shows a simplified schematic representation of a second comparator circuit 50 that includes a second reference signal generator 52. The second comparator circuit 50 is assigned to the second inductor and is at least indirectly coupled to the second inductor, as explained below.

The second comparator circuit 50 essentially corresponds to the first comparator circuit 10. The second comparator circuit 50 also includes a greater-than element 54 and a less-than element 56. A second fault current signal 20B is provided at the input node 58, which indicates a measure of the deviation of the actual current signal of the second inductor from the target current signal.

The second reference signal generator 52 does not include a ramp generator, however. A second reference signal 60, which is constant with respect to time, is provided for the second comparator circuit 50 by the second reference signal generator 52. The second reference signal 60 is also adapted to the underlying switching frequency by means of the timers 62, 64 and is subsequently provided in parallel at inputs of the greater-than element 54 and of the less-than element 56. The greater-than element 54 and the less-than element 56 are designed for determining whether the second fault currrent signal 20B is greater than or less than the second reference signal 60 with respect to the amplitude. In a corresponding way, comparator signals 66, 68 are provided at the output nodes 70, 72 (S, R), respectively, of the second comparator circuit 50 for a second control circuit. As is known, the timers 62, 64 are coupled to the output nodes 72, 70 (R, S), respectively, via feedback loops 74, 76, respectively.

Figure 3:
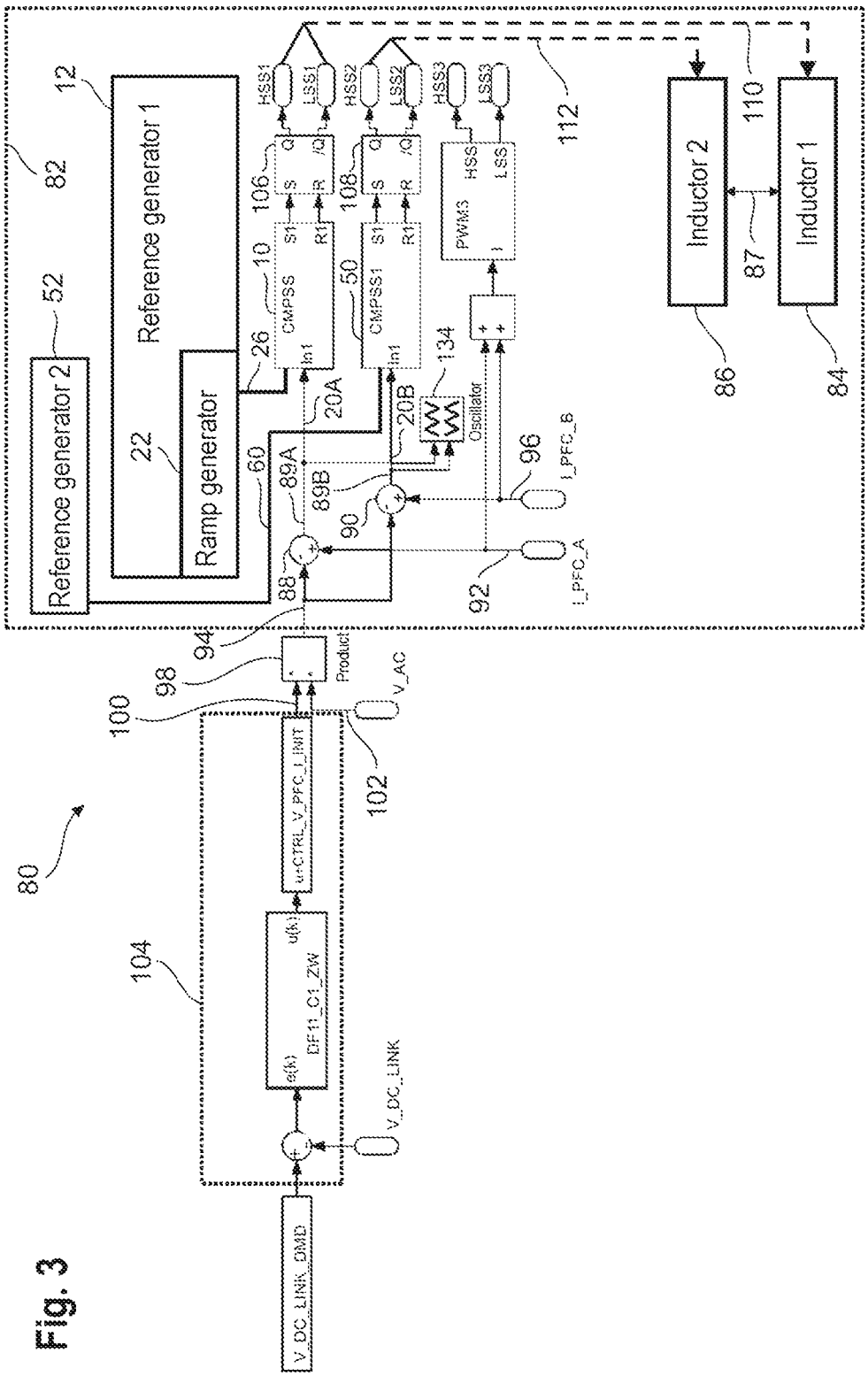
FIG. 3 is a simplified schematic representation of a portion of the electronic circuit of a power factor correction filter.

FIG. 3 shows a simplified schematic representation of a portion of the electronic circuit of a power factor correction filter 80.

The power factor correction filter 80 has an electronic circuit 82, which includes at least the first inductor 84, the second inductor 86, the first comparator circuit 10 (CMPSS), the second comparator circuit 50 (CMPSS1), the first reference signal generator 12, and the second reference signal generator 52.

The first inductor 84 and the second inductor 86 have a common magnetic path 87, via which the first inductor 84 and the second inductor 86 are inductively coupled to each other.

The first comparator circuit 10 is assigned to the first inductor 84. The second comparator circuit 50 is assigned to the second inductor 86.

The first fault current signal 20A and the second fault current signal 20B are provided for the first comparator circuit 10 CMPSS and the second comparator circuit 50 CMPSS1, respectively, by a first differentiating element 88 (corresponds to the first actuating element) and a second differentiating element 90 (corresponds to the second actuating element). The first differentiating element 88 compares the actual current signal 92 I_PFC_A of the first inductor 84 to a target current signal 94, as the result of which the first fault current signal 20A is determined as a differential signal 89A. Correspondingly, the second differentiating element 90 compares the actual current signal 96 I_PFC_B of the second inductor 86 to a target current signal 94, as the result of which the second fault current signal 20B is determined as a differential signal 89B.

In the present case, only a single target current signal 94 is provided in a parallel circuit for the first differentiating element 88 and the second differentiating element 90. Alternatively, different target current signals can be provided for the first differentiating element 88 and the second differentiating element 90 if this is desirable, for example, due to constructional deviations.

The target current signal 94 is provided starting from the multiplication component 98, which multiplies the target current 100 by the input voltage 102 (V_AC), so that the current is guided synchronously with the input voltage 102 (V_AC). A voltage regulator 104 is connected upstream from the multiplication component 98. The voltage regulator 104 and the multiplication component 98 can be parts of the power factor correction filter 80.

If the actual current signal 92 I_PFC_A of the first inductor 84 has a deviation of the phase shift from a predefined phase shift in relation to the actual current signal 96 I_PFC_B of the second inductor 86, this is taken into account by the fault current signals 20A, 20B. Since the first comparator circuit 10 and the second comparator circuit 50 run synchronously due to the timers 28, 30, 62, 64, this deviation from the predefined phase shift can be automatically taken into account by means of the deviating reference signals 26, 60. Only the first reference signal 26 has the ramp components corresponding to the ramp reference signals 24, 25. The deviation from the predefined phase shift influences the point in time at which the particular threshold condition has been satisfied for the greater-than element 14 or the less-than element 16 of the first comparator circuit 10. This can be utilized by means of the control circuits 106, 108 to reduce or compensate for the deviation of the phase shift from the predefined phase shift. As a result, an inadvertent asymmetrical loading of the first inductor 84 and of the second inductor 86 is countered.

The comparator signals 32, 34, 66, 68, which are provided at the outputs of the first comparator circuit 10 and the second comparator circuit 50, are utilized downstream in the present case with the aid of a first control circuit 106 and a second control circuit 108 (here: flip-flops) to switch high-side switches HSS1, HSS2 and low-side switches LSS1, LSS2 such that a deviation from a predefined phase shift between the first current signal 110 for the first inductor 84 and the current signal 112 for the second inductor 86 is reduced or compensated for.

Figure 4:
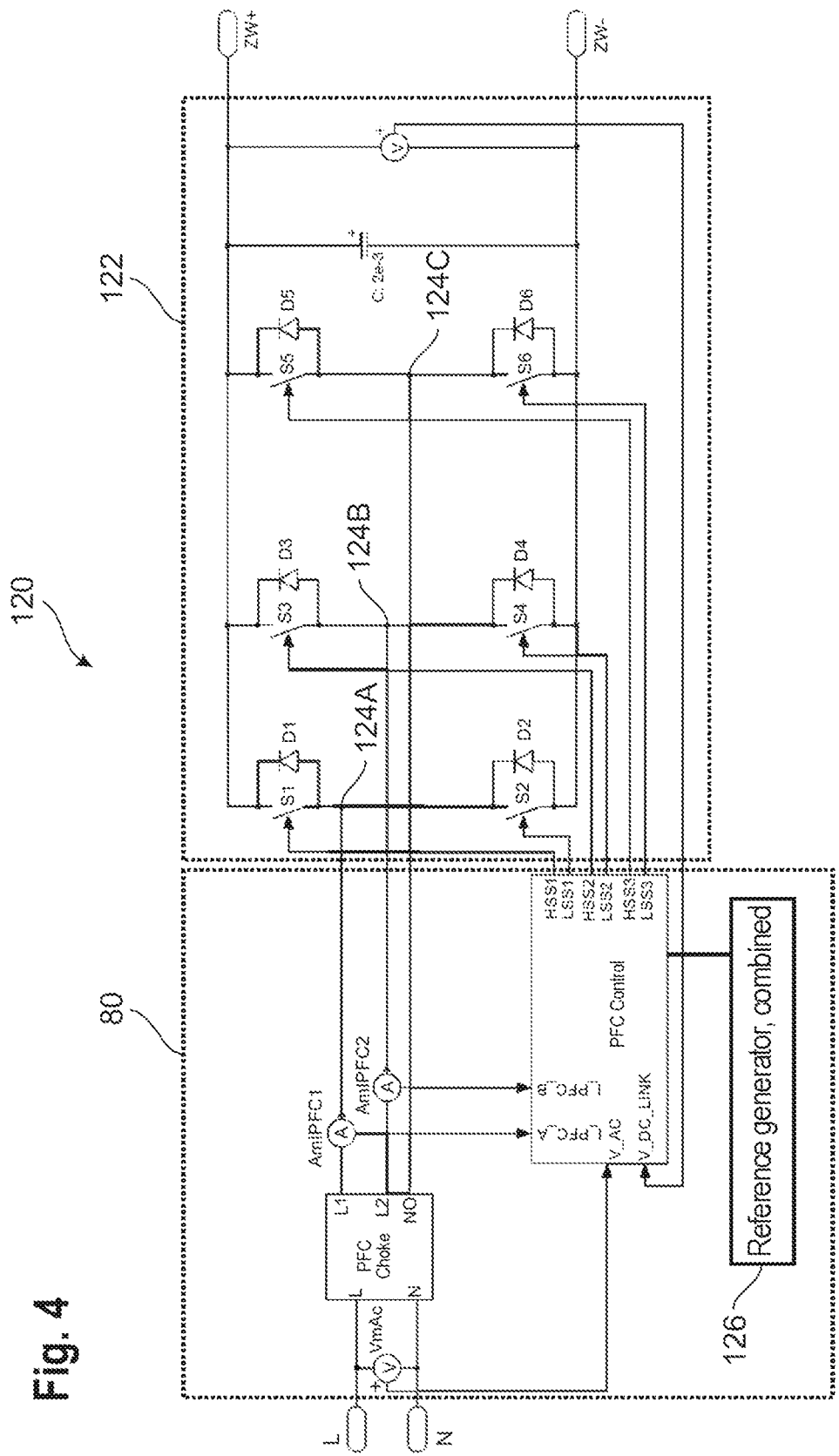
FIG. 4 is a simplified schematic representation of a portion of the electronic circuit of an on-board charging device that includes a power factor correction filter.

FIG. 4 shows a simplified schematic representation of a part of the electronic circuit of an on-board charging device 120 that includes a power factor correction filter 80. The on-board charging device 120 is designed, in particular, for use in at least partially electrically driven vehicles.

The on-board charging device 120 has a half-bridge 122, which includes three center taps 124A, 124B, 124C. The half-bridge 122 is controlled and, in particular, switched by the power factor correction filter 80 such that a deviation of the phase shift between the current signal 110 for the first inductor 84 and the current signal 112 for the second inductor 86 is reduced or compensated for.

In the present case, the power factor correction filter 80 has only one single reference signal generator 126, which combines the functionalities of the above-described first reference signal generator 12 and of the second reference signal generator 52. Due to the use of coupled inductors, optimizations with respect to installation space and weight can be achieved for the on-board charging device 120.

The half-bridge 122 can also be part of the power factor correction filter 80 or of the electronic circuit 82.

The switching of the half-bridge 122 by the power factor correction filter 80 is based, in particular, on the comparator signals 32, 34, 66, 68 of the first comparator circuit 10 and of the second comparator circuit 50, as the result of which the correction of the phase deviation is enabled.

FIG. 5 shows a simplified schematic representation of exemplary current signal profiles 132A, 132B for coupled inductors 84, 86 by utilizing the phase correction mechanism described here. The fault current signals 20A, 20B are shown, which are tapped at the outputs of the first differentiating element 88 and of the second differentiating element 90 by means of an oscilloscope 134 (see FIG. 3). Time is plotted on the x-axis 136. The y-axes 138A, 138B show the amplitudes of the current of the underlying fault current signals 20A, 20B, respectively. It is apparent that the phase shift corresponds exactly to the predefined phase shift, which is 180° in this case. Deviations from the predefined phase shift can be reliably and permanently avoided by means of the electronic circuit 82.

In the present application, reference can be made to amounts and numbers. Unless expressly indicated, such amounts and numbers are not to be considered as limiting, but rather as examples of the possible amounts or numbers in conjunction with the present application. In this context, the term "plurality" can also be used in the present application to refer to an amount or a number. In this context, the term "plurality" means any number that is greater than one, for example, two, three, four, five, etc. The terms "approximately", "close to", etc., mean plus or minus 5% of the indicated value.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An electronic device, comprising:
 a first inductor;
 a second inductor;
 a first comparator circuit;
 a second comparator circuit;
 a first reference signal generator;
 a second reference signal generator;
 a first control circuit; and
 a second control circuit, wherein
  the first inductor and the second inductor are arranged with a common magnetic path, via which path the first inductor and the second inductor are inductively coupled to each other,
  the first comparator circuit is coupled at a first input to a first actuating element, at a second input to the first reference signal generator, and at an output to the first control circuit, wherein the first control circuit is coupled to the first inductor in order to output a first current signal to the first inductor,
  the second comparator circuit is coupled at a first input to a second actuating element, at a second input to the second reference signal generator, and at an output to the second control circuit, wherein the second control circuit is coupled to the second inductor in order to output a second current signal to the second inductor, the first reference signal generator outputs a first reference signal to the first comparator circuit and the second reference signal generator outputs a second reference signal to the second comparator circuit, and the first and second reference signal generators are configured to generate the first reference signal and the second reference signal such that the two reference signals differ from each other with respect to time, in order to reduce a deviation from a predefined phase shift between the first current signal and the second current signal.

2. The electronic device according to claim 1, wherein the first reference signal includes a ramp component, and the second reference signal is constant with respect to time.

3. The electronic device according to claim 1, wherein the first reference signal generator outputs a first ramp reference signal and a second ramp reference signal, which have different slopes, to the first comparator circuit.

4. The electronic device according to claim 1, wherein the first comparator circuit and the second comparator circuit run synchronously with respect to time.

5. The electronic device according to claim 1, wherein the first comparator circuit outputs a first comparator signal to the first control circuit, and the second comparator circuit outputs a second comparator signal to the second control circuit.

6. The electronic device according to claim 5, wherein a phase of the first current signal is adaptable based on the first comparator signal and a phase of the second current signal is adaptable based on the second comparator signal.

7. The electronic device according to claim 6, further comprising:

a half-bridge having at least one center tap, wherein the half-bridge is switchable based on the first comparator signal and/or the second comparator signal such that the phase of the first current signal and/or the phase of the second current signal are/is adapted to predefined phase angles.

8. A power factor correction filter, comprising:

an electronic device according to claim 1, wherein the first inductor and the second inductor are used as inductively coupled inductors of the power factor correction filter.

9. The power factor correction filter according to claim 8, wherein the first actuating element includes a first differentiating element and the second actuating element includes a second differentiating element, the first differentiating element outputs a first differential signal based on a first actual current signal of the first inductor and on a target current signal to the first comparator circuit, and the second differentiating element outputs a second differential signal based on a second actual current signal of the second inductor and on the target current signal to the second comparator circuit.

10. An on-board charging device for an at least partially electrically driven vehicle, comprising:

a power factor correction filter according to claim 8.

* * * * *